(12) United States Patent
Mücke et al.

(10) Patent No.: US 7,430,887 B2
(45) Date of Patent: Oct. 7, 2008

(54) ROLLER FOR DETERMINING VARIATIONS IN FLATNESS

(75) Inventors: Gerd Mücke, Hilden (DE); Eberhard Neuschütz, Ratingen (DE)

(73) Assignee: VDEh-Betriebsforschungsinstitut GmbH, Düsseldorf (DE)

( * ) Notice: Subject to any disclaimer, the term of this patent is extended or adjusted under 35 U.S.C. 154(b) by 0 days.

(21) Appl. No.: 10/502,288

(22) PCT Filed: Jan. 17, 2003

(86) PCT No.: PCT/EP03/00432

§ 371 (c)(1),
(2), (4) Date: Apr. 21, 2005

(87) PCT Pub. No.: WO03/061865

PCT Pub. Date: Jul. 31, 2003

(65) Prior Publication Data

US 2007/0163318 A1     Jul. 19, 2007

(30) Foreign Application Priority Data

Jan. 22, 2002  (DE) ................. 102 07 501

(51) Int. Cl.
*B21B 38/02* (2006.01)
*G01B 7/34* (2006.01)
*G01L 5/10* (2006.01)

(52) U.S. Cl. ............ 72/9.1; 72/11.7; 72/252.5; 492/1; 33/533; 73/862.55; 73/829; 73/862.391; 73/862.07

(58) Field of Classification Search .......... 72/9.1, 72/252.5, 11.7; 73/862.07, 862.55, 862.391, 73/829; 492/1, 3; 33/533
See application file for complete search history.

(56) References Cited

U.S. PATENT DOCUMENTS

| | | | | |
|---|---|---|---|---|
| 3,481,194 A | * | 12/1969 | Carlsson et al. | 73/862.07 |
| 4,127,027 A | * | 11/1978 | Berger et al. | 73/862.07 |
| 4,356,714 A | * | 11/1982 | Quehen | 72/11.7 |
| 4,428,244 A | * | 1/1984 | Takeda | 73/862.07 |
| 4,938,045 A | | 7/1990 | Rosenstock et al. | |
| 4,989,457 A | | 2/1991 | Berger et al. | |
| 5,629,487 A | | 5/1997 | Mücke et al. | |
| 6,070,472 A | * | 6/2000 | Kipping et al. | 73/829 |

(Continued)

FOREIGN PATENT DOCUMENTS

DE    198 38 457 A1    3/2000

(Continued)

OTHER PUBLICATIONS

English-language abstract of DE 19838457 A1, Thomas Derwent 2004.

(Continued)

*Primary Examiner*—Dmitry Suhol
(74) *Attorney, Agent, or Firm*—Finnegan, Henderson, Farabow, Garrett & Dunner, LLP

(57) ABSTRACT

In the case of a measuring roller for determining flatness deviations when handling material in strip form, for example when rolling metal strip, the stress distribution is measured over the width of the strip with the aid of piezoelectric sensors, which are arranged in longitudinal recesses of a solid roller at a distance from the casing surface and are wedged there

16 Claims, 9 Drawing Sheets

U.S. PATENT DOCUMENTS

Figure 1:
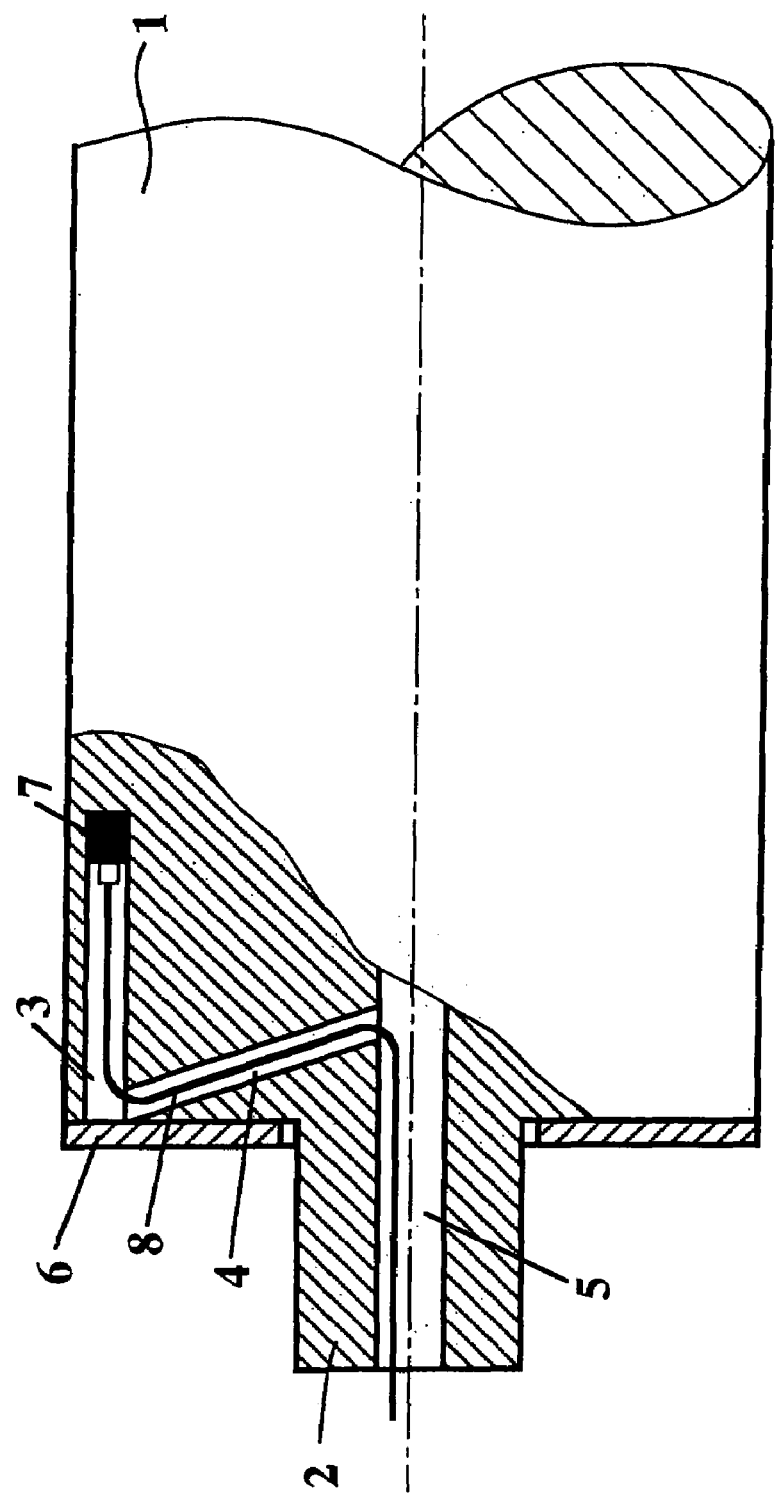

| | | | |
|---|---|---|---|
| 6,138,506 | A | 10/2000 | Neuschütz et al. |
| 6,354,013 | B1 * | 3/2002 | Mucke et al. .................. 33/533 |
| 6,668,626 | B2 * | 12/2003 | Grefve et al. .................. 73/104 |
| 2002/0178840 | A1 * | 12/2002 | Malard et al. .......... 73/862.391 |

FOREIGN PATENT DOCUMENTS

| DE | 19918699 A1 * | 11/2000 |
|---|---|---|
| GB | 1056869 | 2/1967 |
| JP | 2000-337868 | 12/2000 |

OTHER PUBLICATIONS

International Search Report for PCT Application No. PCT/EP03/00432.

English Translation of PCT International Preliminary Examination Report in International Application No. PCT/EP/03/000432.

* cited by examiner

ROLLER FOR DETERMINING VARIATIONS IN FLATNESS

The invention relates to a solid roller for determining flatness deviations when handling material in strip form.

Such solid rollers are used in the cold and hot rolling of metal strip and are known for example from DE 42 36 657 A1.

The conventional measuring of flatness when rolling strips is in most cases performed by using methods in which the strip is passed over a measuring roller fitted with sensors at a certain angle of wrap.

In the case of the measuring roller described in DE 42 36 657 A1, this causes contact between force measuring transducers or their coverings, which are arranged in radial bores of the measuring roller that are open toward the surface of the roller, and the strip. Between the sensors mounted at the bottom of their recess and the wall of the bores surrounding them there is a cylindrical gap. This gap may be closed by an O-ring, flush with the shoulder, or by a layer of plastic, flush with the front, in order to prevent the penetration of dirt, for example material abraded from the strip and lubricant, into the annular gaps between the sensor and the roller body. It is also possible, as represented in FIG. 1c in DE 42 36 657 A1, to place the measuring transducer in a recess of the solid roller which is then covered with a worked membrane.

The arrangement of the sensors (force measuring transducers) at a distance from the wall surrounding them and the closing of the annular gap with the aid of an O-ring or a sufficiently elastic plastic (DE 196 16 980 A1) prevents transverse forces that are active in the body of the roller during the rolling from having adverse effects on the force measuring transducers or the measuring result. Such disruptive forces are the consequence of the strip tension acting on the measuring roller and associated bending of the roller. The cross section of the latter in this case assumes the form of an ellipse, the longer axis of which runs parallel to the strip. The bending of the roller falsely indicates to the force measuring transducer an unevenness of the strip if it is transmitted to the measuring transducer by means of a force bypass. Such a force bypass cannot be entirely avoided when a seal is used in the annular gap, since the sealing forces inevitably act on the sensor.

A measuring roller with a closed casing in the form of a tube covering over the surface of the roller is also already known from DE 198 38 457 A1. In the case of this measuring roller, the sensors are likewise arranged or mounted in radially open bores. However, it is difficult to apply such a casing tube to the roller fitted with the measuring transducers. This generally takes place by shrinking on a previously heated tube. However, this is accompanied by the risk of damage to the sensors (measuring transducers) by the heat of the tube. This is so because the known sensors usually operate with a piezoelectric quartz, on the crystal surface of which the force to be measured produces charges which serve as a measured variable. Although sensors of this type have a high response sensitivity, a high resonant frequency and stability with small dimensions, and make it possible to compensate for initial loads without impairment of the measuring result, they cannot withstand temperatures over approximately 200° C., because at higher temperatures there is a charge induced by the force to be measured that is retained, depending on the duration of the thermal loading, and consequently leads to a falsification of the measuring result. Therefore, without special measures, piezoelectric sensors are not suitable for the hot shrinking on of a casing tube or for measuring the pressure distribution during hot strip rolling.

Furthermore, when shrinking on a heated tube, surface working of the casing tube is required. Similar problems arise if not a casing tube but a multiplicity of casing rings are shrunk onto the roller body. There is also the problem that small circumferential grooves can form where the rings butt against one another, possibly causing impairment of the surface quality of the strip passed over the measuring roller.

A further disadvantage of using casing tubes or rings arises from the different bending and thermal expansion in comparison with the body of the roller, possibly leading to undesired internal stresses and to the detachment of the casing roller or the casing rings.

The known measuring rollers have—independently of the type and arrangement of the sensors in the radial roller bores—the disadvantage that the use of an O-ring or the closing of the approximately 0.05 mm wide annular gap with an elastic plastic is laborious and ultimately also does not produce a completely closed roller surface. Furthermore, even at temperatures over approximately 230° Celsius there is the risk of the O-ring or the plastic filling being destroyed and metallic abrasive matter and/or lubricant then penetrating into the annular gap.

In addition, there is the risk that, during the customary final abrasive working of the measuring roller, high grinding temperatures may occur and possibly lead to a microstructural transformation of the covers with which the sensors are usually provided. The grinding temperatures must therefore be kept low.

Finally, there is the necessity to improve the wear resistance of the measuring rollers by surface hardening. Since stress cracks can easily occur during the heating involved in the hardening and subsequent quenching of the roller surface, the rollers are usually first hardened and then the bores for the sensors are introduced. In view of the necessity for special tools, this causes high production costs for the drilling.

The invention is therefore based on the problem of avoiding the difficulties caused by the presence of an annular gap at the roller surface in the case of a solid roller of the type stated at the beginning, without having to use a casing tube or casing rings to do so.

This object may be achieved by the features described herien.

The recesses may be bores or else for example channels of a square cross section produced by cavity sinking by EDM. Therefore, hereafter the term bores includes all cross sections that come into consideration and methods for their production.

The axial accessibility of the recesses for the sensors is provided for example in the case of a roller with axially parallel bores which run from one end face to the other or are formed as blind bores. The sensors can then be placed in the bores at different depths from one end face, so that individual sensors in adjacent bores are arranged staggered on a helical line extending over the entire width of the roller. However, it is also possible for a number of sensors to be arranged at a distance from one another in one bore.

The sensors should be fixed or clamped in the bores, for example wedged. If different prestresses occur during clamping, they can be readily compensated by techniques used in measuring technology. On the other hand, however, the prestressing can also be deliberately dosed, in order to compensate for production tolerances both of the sensors and of the bores. In this case, sensors with plane-parallel surfaces may be arranged between wedge-shaped holding pieces, for example clamping wedges, which are moved toward one another until the sensor is immovably clamped between the holding pieces.

One of the two holding pieces is normally arranged fixedly in the bore at the location where the sensor is to be placed, while the other holding piece is displaced in the bore to fix the sensor. This may take place with the aid of a clamping screw, which is supported on the roller body and acts on the movable holding piece via a spacing sleeve.

The arrangement of a number of sensors in radially movable sliding pieces which are fixed in the bore with the aid of a wedge strip is particularly favorable. The sliding pieces may be arranged in a spacing strip and be pressed radially outward with the aid of wedge-shaped holding lugs of a clamping strip and in this way be clamped in the solid roller.

To safely accommodate the lines leading to the sensors, the bores may be connected to parallel running cable ducts. Alternatively, however, the bores may also be connected via a transverse channel to a central cable bore in the roller. The transverse channel may run in the body of the roller or as an open channel on the end face of the roller and then be closed by a cover.

In order to guide the holding pieces for the sensors or the strips in the bores, they may be provided with a longitudinal rib, which engages in a complementary guiding groove in the body of the roller.

If the axially parallel bores are arranged at a small distance of, for example, 1 to 30 mm, preferably 5 to 10 mm, beneath the roller surface, the clamped-in sensors form a thin bending beam, which has all the more favorable an effect on the measuring result the smaller its thickness is, because it absorbs virtually no transverse forces, or at most extremely small transverse forces.

One particular advantage of the solid roller according to the invention arises from the fact that the roller body requires only two machining steps, that is on the one hand the introduction of the longitudinal bores or channels and on the other hand the placement of the sensors in their bores. In this case, the axially parallel bores (recesses) can be introduced into the body of the roller with relatively little production effort before hardening. In this way, a one-piece measuring roller with a completely closed casing surface is obtained, and is therefore not contaminated by material falsifying the measuring result or impairing the surface quality of the strip material. Furthermore, the closed surface has the associated advantage that the roller can also be used for example as a live roller, for example in the cold or hot rolling of metal strip.

The continuous roller surface allows coating of the casing surface with wear-resistant metallic or non-metallic or ceramic materials, for example with tungsten, molybdenum and tantalum and their alloys or with carbides, nitrides, borides, silicides and oxides. Furthermore, the casing surface or else the coating may be provided with a texture, in order to structure the surface of the material in strip form passed over the roller.

Figure 2:
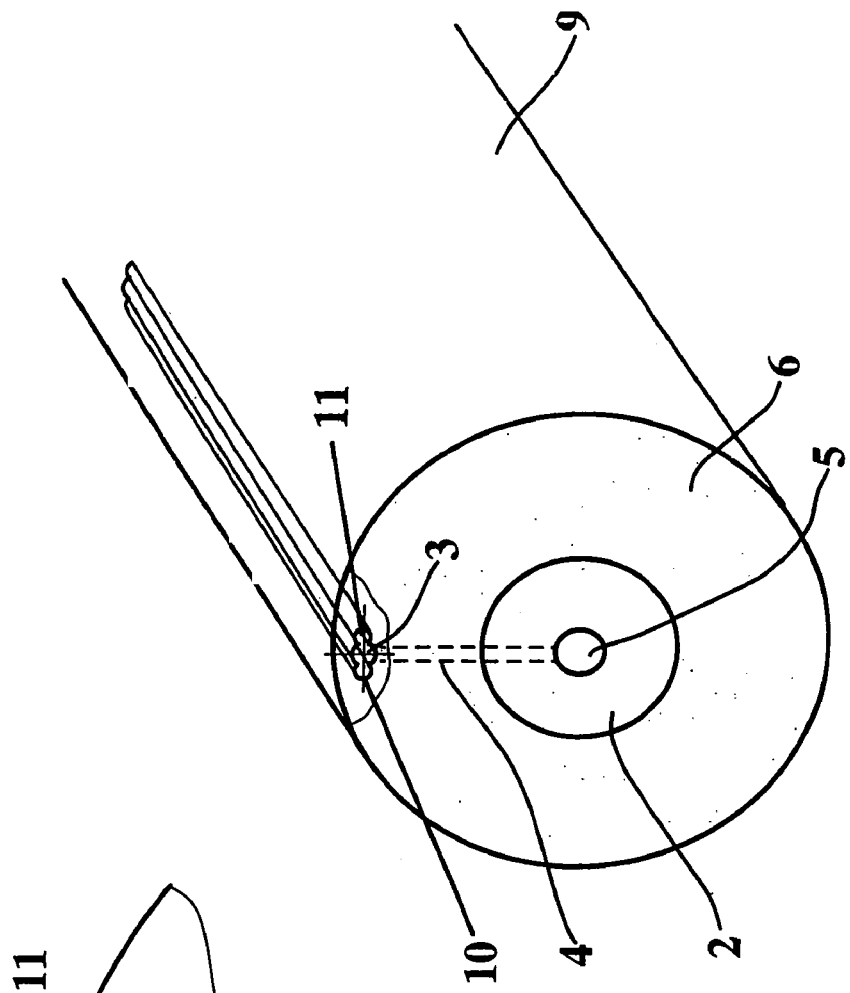
Figure 3:
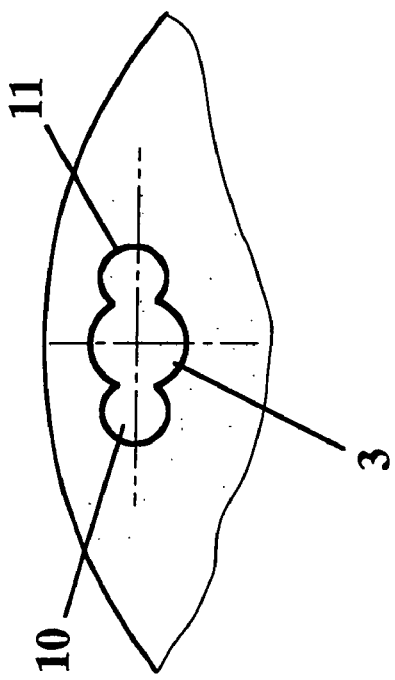
Figure 4:
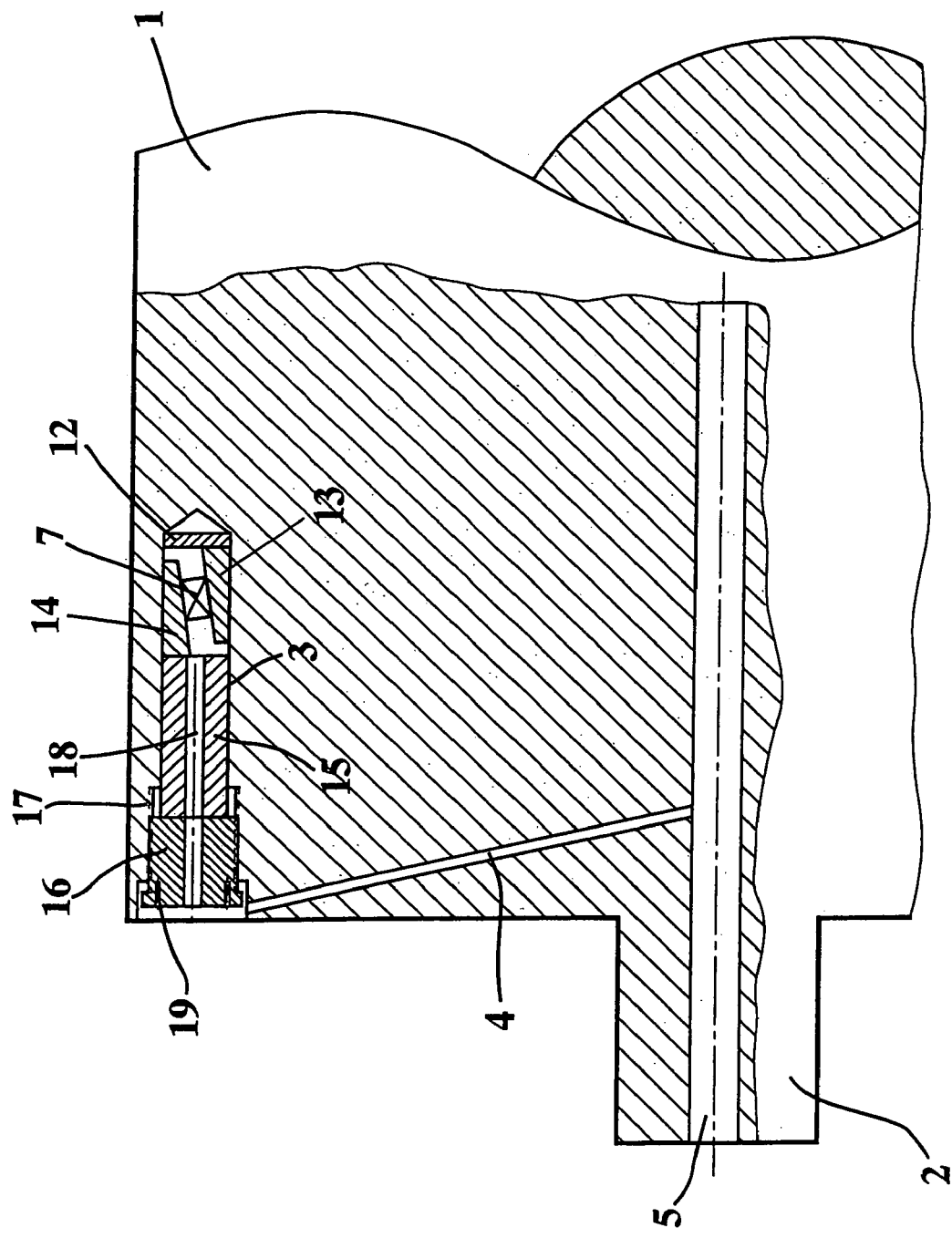
Figure 5:
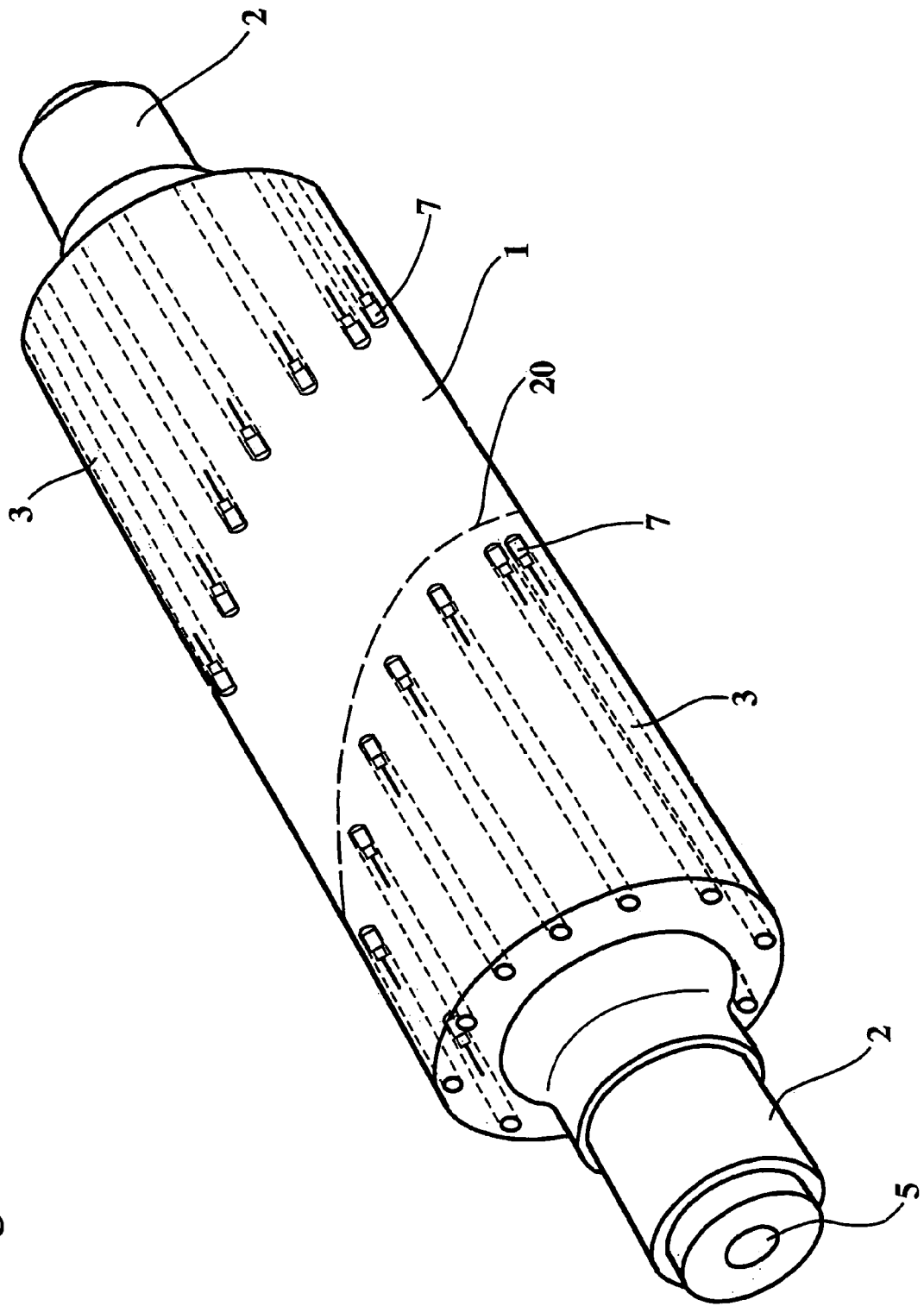
Figure 6:
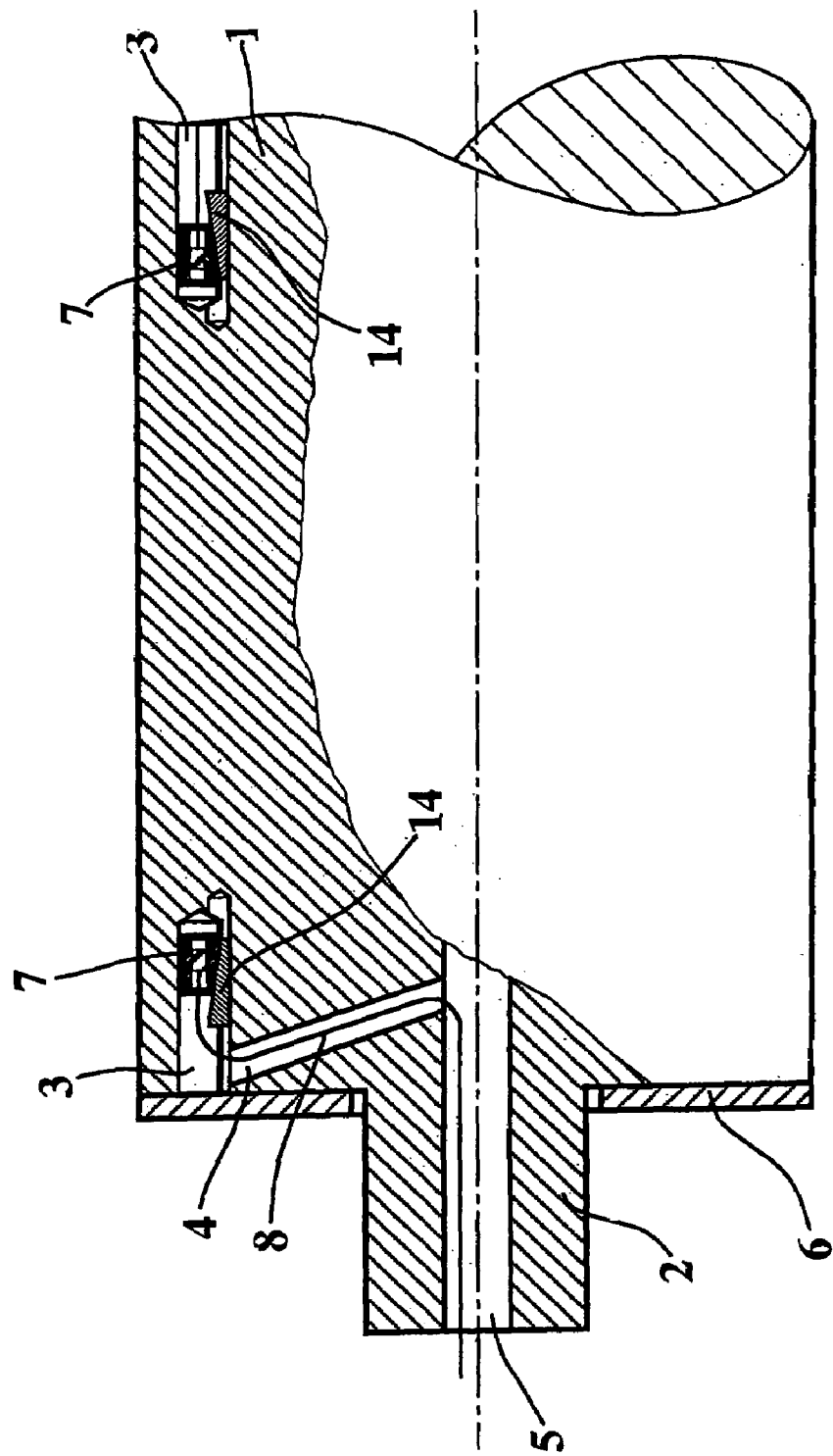
Figure 8:
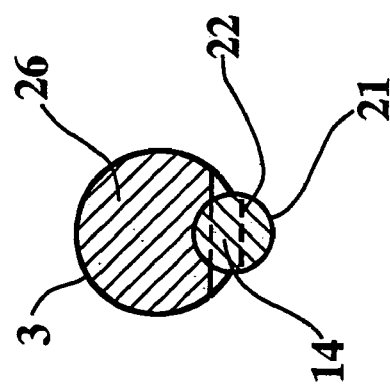
Figure 7:
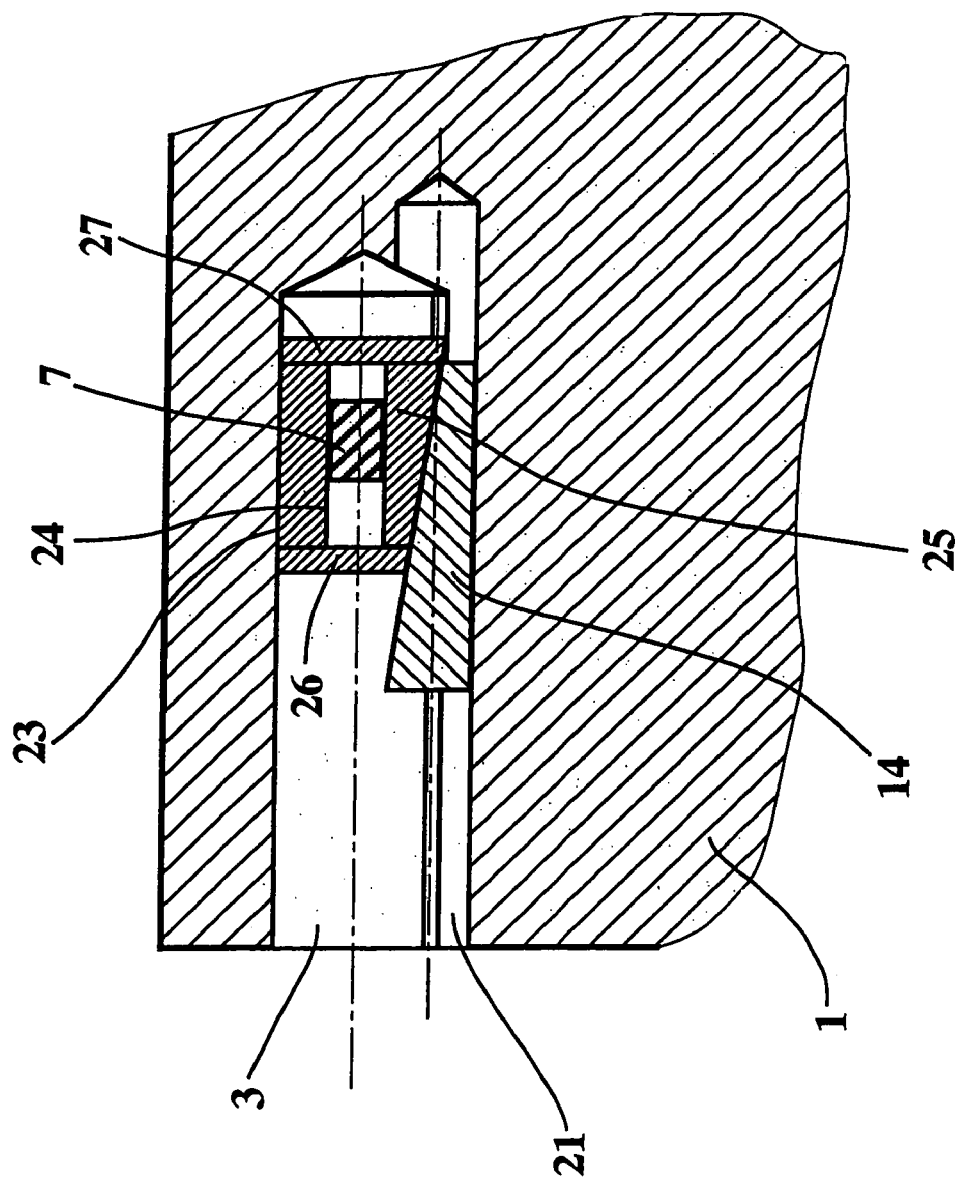
Figure 9:
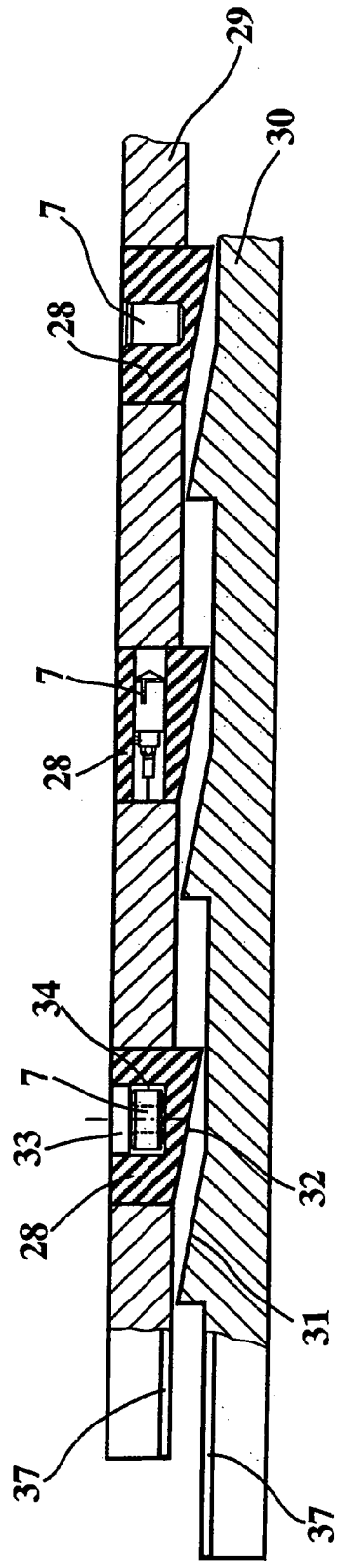
Figure 10:
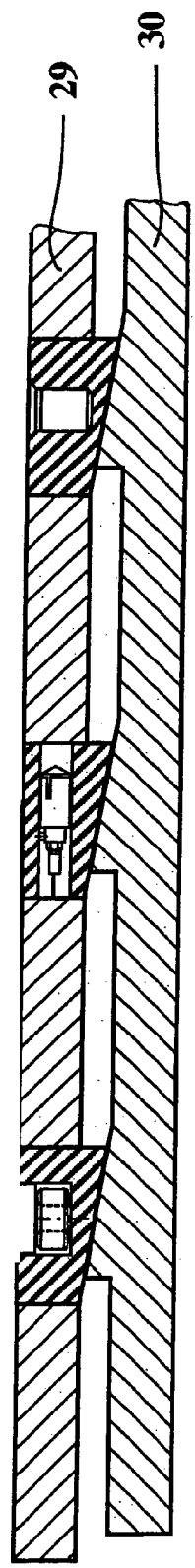
Figure 11:
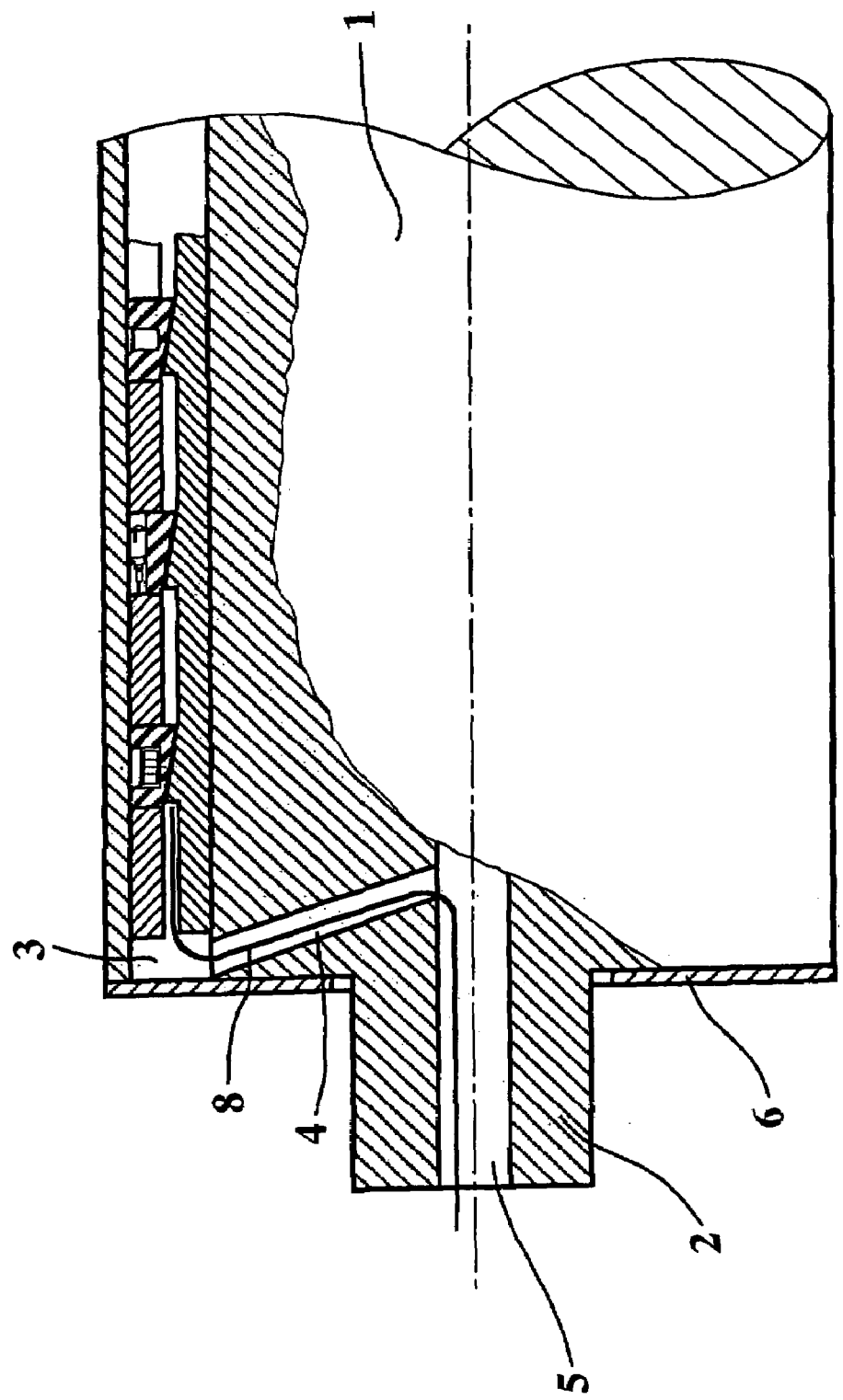
Figure 12:
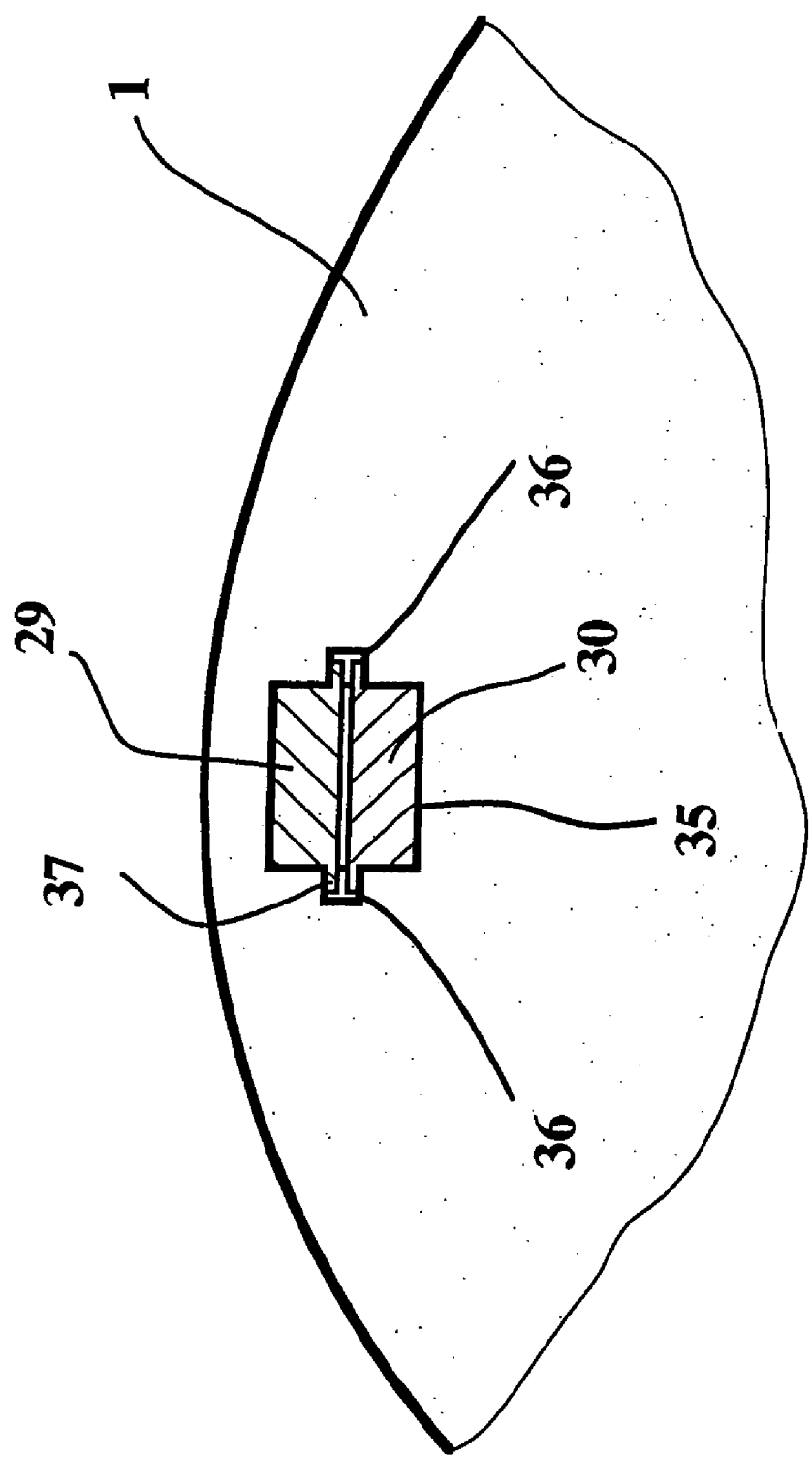

The invention is explained in more detail below on the basis of exemplary embodiments represented in the drawing, in which:

FIG. 1 shows the side view of a measuring roller partly in section,

FIG. 2 shows a measuring roller with cable ducts in a perspective representation, FIG. 3 shows a detail of an end view of the measuring roller according to FIG. 2, FIG. 4 shows a measuring roller with an axial bore with a sensor clamped radially in it, FIG. 5 shows the perspective view of a measuring roller with staggered sensors arranged along a helical line, FIG. 6 shows a measuring roller with two sensors lying opposite each other, FIG. 7 shows part of a roller with a sensor in a multi-part housing, FIG. 8 shows a plan view of the bore according to FIG. 7, FIG. 9 shows a spacing strip in connection with an associated wedge strip before the clamping of the sensors, FIG. 10 shows the two strips of FIG. 9 with the clamped sensors, FIG. 11 shows a measuring roller with the two strips in the situation according to FIG. 10 and FIG. 12 shows an end-on plan view of part of the roller according to FIG. 11 with a cross-sectionally rectangular recess.

The measuring roller 1 according to the invention, with a journal 2, has just under its surface axially parallel bores 3 arranged in a circle, from which transverse channels 4 branch off close to the end face of said bores and lead to a central cable duct 5. The bores are closed by a cover 6 or each closed individually by covers and contain sensors 7, from which a cable 8 is respectively led to the outside through the bore 3, the transverse channel 4 and the central channel 5.

The measuring roller 9, represented in a schematic-perspective manner in FIGS. 2 and 3, has parallel to each bore 3 cable ducts 10, 11 lying opposite each other for lines led to the outside via the transverse channel 4 and the central channel 5.

In the case of the measuring roller 1 represented in FIG. 4, the sensors 7 are arranged in a bore 3 with an end plate 12 between a holding piece in the form of a fixed clamping wedge 13 and a holding piece in the form of a movable wedge 14, which can be displaced in the axial direction. A spacing sleeve 15 bears against the movable wedge 14. The clamping screw 16 is provided with an external thread, which is screwed into the internal thread 17 of the stepped bore 3. Both the spacing sleeve and the clamping screw have a channel 18 for leading through a cable. With the aid of a wrench acting on the head 19 of the clamping screw 16, the spacing sleeve 15 and the movable wedge 14 can be moved deeper into the bore 3 and the sensor 7 can in this way be radially clamped between the two wedges 13, 14.

As represented in FIGS. 5 and 6, the bores may extend from both end faces of the roller 1 and, as blind bores, have different depths. This has the effect that the individual sensors are arranged along a helical line 20, i.e. staggered, and altogether cover the entire width of the roller 1.

As represented in FIGS. 7, 8, the bores 3 may also be connected to a longitudinal groove 21, in which the lower part 22 of a movable clamping wedge 14 is guided and the sloping surface of which interacts with a sloping surface of a housing 23. During the radial clamping of the housing 23 with the clamping wedge 14 guided in the longitudinal groove 21, it is ensured that the housing 23 cannot twist in the bore 3.

In the case of the measuring roller 1 represented, the sensor 7 is arranged in a four-part housing 23 with parallel clamping surfaces 24, 25 lying opposite each other and two end plates 26, 27.

The sensors 7 may also be arranged in radially movable sliding pieces 28 of a spacing strip 29, which interacts with an axially parallel displaceable clamping strip in the form of a wedge strip 30 for the radial clamping of the sliding pieces 28, as is represented in FIGS. 9 to 11. While the spacing strip 29 is fixedly arranged in its bore 3, the wedge strip serves the purpose of moving the sliding pieces 28 radially outward with its wedge surfaces 31 in interaction with complementary sloping surfaces 32, and in this way radially clamping the sliding pieces 28 with the sensors 7 immovably arranged in them and their covers 33. The cover 33 is guided in a bore 34 of the sliding piece 28 without touching the wall and has on its underside a recess (not represented), which receives the cable connection of the sensor.

Represented in FIG. 12 is a measuring roller 1 with a cross-sectionally rectangular longitudinal recess 35, which is provided with lateral slits 36. These slits serve the purpose of widening the bending beam-produced above the longitudinal recess 35 for a sensor, in order to improve the elastic behavior of the bending beam. The slits may also serve as a guide for longitudinal ribs on the sensor, on holding pieces or on spacing or clamping strips and/or they may also serve as cable ducts.

The invention claimed is:

1. A solid roller for detecting flatness deviations in a material, said material being in strip form, said roller comprising:
   a central axis; and
   a solid, monolithic body extending from a first axial end of the roller to an opposite axial end of the roller, the monolithic body having:
      a first end face at the first axial end;
      a second end face at the opposite axial end;
      a seamless outer radial surface extending from the first end face to the second end face;
      a plurality of parallel bores extending fully encompassed in said body from one of said first or second end faces, and axially with respect to the central axis of said solid roller; and
   a plurality of sensors received within said plurality of parallel bores, at least one of said plurality of sensors being axially accessible through one of said plurality of parallel bores from one of said first or second end faces; and
   the plurality of parallel bores sized to provide the only access to the one or more sensors that is capable of insertion and removal of the one or more sensors from the body.

2. A solid roller in accordance with claim 1, wherein said plurality of parallel bores extend continuously from said first end face to said second end face.

3. A solid roller in accordance with claim 1, wherein said plurality of parallel bores have different lengths.

4. A solid roller in accordance with claim 1, wherein one of said plurality of sensors has first and second plane-parallel surfaces, said solid roller comprising first and second holding pieces, said first and second plane-parallel surfaces being provided between said first and second holding pieces.

5. A solid roller in accordance with claim 4, wherein said plurality of plane-parallel surfaces extend parallel to the central axis of said solid roller.

6. A solid roller in accordance with claim 1, further comprising a parallel running channel, wherein said plurality of parallel bores are connected to said parallel running channel.

7. A solid roller in accordance with claim 1, further comprising a central cable bore and a plurality of transverse channels, said plurality of parallel bores being connected to said central cable bore by said plurality of transverse channels.

8. A solid roller in accordance with claim 1, further comprising a cover, wherein said plurality of bores are closed at said one of said first and second end faces by said cover.

9. A solid roller in accordance with claim 1, further comprising a multipart housing, said plurality of sensors being arranged in said multi-part housing.

10. A solid roller for detecting flatness deviations in a material, said material being in strip form, said roller comprising:
    a central axis; and
    a solid, monolithic body extending from a first axial end of the roller to an opposite axial end of the roller, the monolithic body having:
       a first end face at the first axial end;
       a second end face at the opposite axial end;
       a seamless outer radial surface extending from the first end face to the second end face;
       a plurality of parallel bores extending fully encompassed in said body from one of said first or second end faces, and axially with respect to the central axis of said solid roller;
       a wedge, said wedge being provided in one of said plurality of parallel bores; and
    a plurality of sensors received within said plurality of parallel bores, at least one of said plurality of sensors being held by the wedge and axially accessible through one of said plurality of parallel bores from one of said first or second end faces; and
    the plurality of parallel bores sized to provide the only access to the one or more sensors that is capable of insertion and removal of the one or more sensors from the body.

11. A solid roller in accordance with claim 10, wherein said wedge is a first wedge, said solid roller further comprising a second wedge provided in said one of said plurality of parallel bores, one of said plurality of sensors being clamped by said first and second wedges.

12. A solid roller in accordance with claim 10, further comprising:
    a spacing strip;
    a plurality of radially movable sliding pieces; and
    a clamping strip, wherein a group of said plurality of sensors are provided in said one of said plurality of parallel bores, each of said group of said plurality of sensors being provided in a respective one of said plurality of radially movable sliding pieces, said plurality of radially movable sliding pieces being provided in said spacing strip, and said clamping strip being configured to fix said plurality of radially movable sliding pieces.

13. A solid roller in accordance with claim 12, further comprising a complementary guiding slit, wherein one of said spacing strip and said clamping strip is provided with a longitudinal rib, said longitudinal rib being configured to engage said complementary guiding slit.

14. A roller for detecting flatness deviations in a material, said material being in strip form, said roller comprising:
    a central axis; and
    a solid, monolithic body extending from a first axial end of the roller to an opposite axial end of the roller, the monolithic body having
    a first end face at the first axial end;
    a second end face at the opposite axial end;
    a seamless outer radial surface extending from the first end face to the second end face;
    a plurality of first openings parallel to the central axis of the roller;
    a second opening parallel to the plurality of axial openings;
    a plurality of third openings connecting said plurality of first openings and said second opening; one or more sensors received within said plurality of first openings, the plurality of first openings sized to provide the only access to the one or more sensors that is capable of insertion and removal of the one or more sensors from the body; and one or more sensor cables coupled to said one or more sensors, wherein said one or more sensor cables are received in at least one of said plurality of first openings, said second opening, and said plurality of third openings.

15. A roller in accordance with claim 14, wherein said roller includes a continuous cylindrical outer roller surface.

16. A roller in accordance with claim 14, wherein said one or more sensors are slidably received within said plurality of first openings.

* * * * *